United States Patent
Smith et al.

(10) Patent No.: US 10,165,827 B2
(45) Date of Patent: Jan. 1, 2019

(54) OUTSOLE WITH GRIP REDUCTION EXTENSION MEMBERS

(71) Applicant: NIKE, Inc., Beaverton, OR (US)

(72) Inventors: Mark Smith, Portland, OR (US); Adam Welliver, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/546,643

(22) Filed: Nov. 18, 2014

(65) Prior Publication Data
US 2016/0135540 A1    May 19, 2016

(51) Int. Cl.
| A43B 23/28 | (2006.01) |
| A43B 13/22 | (2006.01) |
| A43B 13/26 | (2006.01) |
| B29D 35/12 | (2010.01) |

(52) U.S. Cl.
CPC .............. *A43B 13/22* (2013.01); *A43B 13/26* (2013.01); *B29D 35/122* (2013.01)

(58) Field of Classification Search
CPC ......... A43B 13/22; A43B 13/26; A43B 13/00; A43B 13/14; A43B 13/141; A43B 13/145; B29D 35/122
USPC .......................... 36/59 R, 59 C, 61, 103, 102
See application file for complete search history.

(56) References Cited

U.S. PATENT DOCUMENTS

| 989,514 | A | * | 4/1911 | Sanford | A43B 13/223 248/363 |
| 2,038,972 | A | * | 4/1936 | Watanabe | A43B 13/223 36/32 R |
| 2,235,774 | A | * | 3/1941 | Pierce | A43C 15/161 36/59 R |
| 2,406,476 | A | * | 8/1946 | Sampson | A43C 15/162 36/59 R |

(Continued)

FOREIGN PATENT DOCUMENTS

| CN | 104105424 A | 10/2014 |
| DE | 2828561 A1 | 1/1980 |

(Continued)

OTHER PUBLICATIONS

Arkamix: "Nike Lady Waffle Trainer 1976-1979", Internet Nov. 3, 2014 (Nov. 3, 2014), XP002753090, Retrieved from the Internet: URL:https://web.archive.org/web/20141103060405/http://www.arkamix.com/vintage-nike/running/nike-lady-waffle-trainer-1976-1979.

(Continued)

*Primary Examiner* — Timothy K Trieu
(74) *Attorney, Agent, or Firm* — Shook, Hardy & Bacon, LLP (57) ABSTRACT

The present invention is directed to an outsole for footwear that reduces grip and enables controlled slippage on a surface during wear. The outsole includes a plurality of low profile tread projections, each tread projection having at least one long, thin, and flexible extension member. An increased width of the extension member where it adjoins (Continued)

the tread projection acts as a pivot point at which the extension member may flex and bend degrees. During wear, the flexible extension members bend over or collapse, becoming sandwiched between the tread projections and a surface. The bent extension members reduce the contact area between the tread projections and a surface, thereby reducing grip and enabling slippage.

18 Claims, 7 Drawing Sheets

(56) References Cited

U.S. PATENT DOCUMENTS

| | | | | |
|---|---|---|---|---|
| 3,587,181 | A * | 6/1971 | Rockland | A43C 15/161 264/244 |
| 3,932,950 | A * | 1/1976 | Taber | A43B 13/223 36/32 R |
| 4,085,527 | A * | 4/1978 | Riggs | A43B 5/06 36/114 |
| 4,098,011 | A * | 7/1978 | Bowerman | A43B 5/06 36/129 |
| 4,135,317 | A * | 1/1979 | Ikeda | A43B 13/26 36/134 |
| D256,180 | S * | 8/1980 | Turner | D2/954 |
| 4,255,877 | A * | 3/1981 | Bowerman | A43B 23/17 36/128 |
| 4,294,024 | A * | 10/1981 | Nab | A43C 15/165 36/113 |
| 4,316,332 | A * | 2/1982 | Giese | A43B 5/00 36/114 |
| 4,316,335 | A * | 2/1982 | Giese | A43B 5/00 36/129 |
| D264,017 | S * | 4/1982 | Turner | D2/954 |
| 4,335,529 | A * | 6/1982 | Badalamenti | A43B 5/00 36/114 |
| 4,361,971 | A * | 12/1982 | Bowerman | A43B 5/06 36/129 |
| 4,375,728 | A | 3/1983 | Dassler | |
| 4,378,643 | A * | 4/1983 | Johnson | A43B 13/223 36/129 |
| 4,439,936 | A * | 4/1984 | Clarke | A43B 5/06 36/102 |
| 4,465,448 | A | 8/1984 | Aldridge | |
| 4,538,366 | A * | 9/1985 | Norton | A43B 13/223 36/32 R |
| D290,781 | S * | 7/1987 | Grubel | D2/955 |
| 5,634,283 | A * | 6/1997 | Kastner | A43C 15/00 36/15 |
| D386,593 | S * | 11/1997 | Fogg | D2/953 |
| D392,446 | S * | 3/1998 | Fogg | D2/954 |
| 5,806,210 | A * | 9/1998 | Meschan | A43B 21/26 36/36 B |
| 6,115,941 | A * | 9/2000 | Ellis, III | A43B 5/00 36/114 |
| 6,385,866 | B1 * | 5/2002 | Sotter | A43C 15/167 36/59 C |
| 7,127,834 | B2 * | 10/2006 | Ellis, III | A43B 5/00 36/25 R |
| 7,540,099 | B2 * | 6/2009 | Meschan | A43B 3/0042 36/25 R |
| 7,941,945 | B2 * | 5/2011 | Gerber | A43B 13/145 36/134 |
| 8,375,604 | B2 * | 2/2013 | Eder | A43B 13/26 36/114 |
| 8,806,779 | B2 * | 8/2014 | Auger | A43B 5/02 36/67 A |
| 8,984,774 | B2 * | 3/2015 | Minami | A43B 13/223 36/128 |
| 9,173,450 | B2 * | 11/2015 | Minami | A43B 13/223 |
| 2004/0088883 | A1 * | 5/2004 | Workman | A43B 3/18 36/15 |
| 2004/0139630 | A1 * | 7/2004 | Gerwin | A43B 7/32 36/72 R |
| 2008/0000102 | A1 * | 1/2008 | Rastegar | A43B 1/0027 36/7.6 |
| 2008/0000104 | A1 * | 1/2008 | Rastegar | A43B 5/18 36/62 |
| 2008/0222921 | A1 * | 9/2008 | Gerber | A43B 13/26 36/103 |
| 2010/0260880 | A1 | 10/2010 | Lin | |
| 2013/0125417 | A1 * | 5/2013 | Minami | A43B 5/025 36/83 |
| 2013/0232823 | A1 * | 9/2013 | Kasprzak | A43B 13/223 36/103 |
| 2013/0333251 | A1 * | 12/2013 | Taniguchi | A43B 5/02 36/30 R |
| 2014/0026444 | A1 * | 1/2014 | Howley | A43B 13/14 36/134 |

FOREIGN PATENT DOCUMENTS

| | | |
|---|---|---|
| DE | 8227586 U1 | 3/1987 |
| EP | 0363217 A2 | 4/1990 |
| EP | 1557104 A1 | 7/2005 |
| WO | 2013039702 A2 | 3/2013 |

OTHER PUBLICATIONS

Wikipedia: "Nike timeline", Internet Aug. 12, 2014 (Aug. 12, 2014), XP002753091, Retrieved from the Internet: URL: https://en.wikipedia.org/w/index.php?title=Nike timeline&oldid=62085720.

Rob Hayashida: "Nike Golf Introduces: Nike Lunar Waverly and Lunar Mont Royal Golf Shoes", Internet Jun. 24, 2014 (Jun. 24, 2014), XP002753092, Retrieved from the Internet: URL:http://www.sandbox8.com/2014/06/24/nike-golf-introduces-nike-lunar-waverly-and-lunar-mont-royal-golf-shoes/.

Miss Cellania: "Family Feud: Adidas vs. Puma", Internet Nov. 19, 2012 (Nov. 19, 2012), XP002753088, Retrieved from the Internet: URL:http://www.neatorama.com/2012/11/19/Family-Feud-Adidas-vs-Puma/.

G-Money: "Featured Shoes: Puma Easy Rider III Wash Sneakers", Internet Apr. 12, 2010 (Apr. 12, 2010), XP002753089, Retrieved from the Internet: URL:http://www.soleredemption.com/puma-easy-rider-iii-wash.

International Search Report and Written Opinion Dated Jan. 27, 2016 for PCT Patent Application No. PCT/US22015/059504, 20 Pages.

International Preliminary Report on Patentability dated Jun. 1, 2017 in International Patent Application No. PCT/US2015/059504, 12 pages.

* cited by examiner

OUTSOLE WITH GRIP REDUCTION EXTENSION MEMBERS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Aspects of a concept provided herein relate to an outsole. More specifically, the aspects relate to an outsole with extension members that affect surface grip and reduce traction of a tread. The present invention may further relate to an outsole with reduced traction and grip, or with increased maneuverability, which may be beneficial and useful in activities and applications.

BACKGROUND

Athletes generally rely on the outsole of footwear to increase traction or stabilize the footwear's grip on various surfaces in order to prevent injury and improve their athletic performance. For example, an athlete may wear a shoe having an outsole tread that is designed to prevent slippage during wet conditions or when cutting during sports play.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims.

An article of footwear, including an outsole, may be constructed so as to increase grip. However, certain activities or sports maneuvers require less grip or traction in order to enable the wearer to slide, slip, and/or glide. For example, bowling requires footwear outsoles to act as a brake, yet also as a slicker, thereby enabling the back foot to slide across the floor during the delivery (e.g., release and follow-through) of the ball. Additionally, a reduction in strain and stress on a user's joints and body may be desired in connection with some ground surfaces. Therefore, an article of footwear having a controlled traction reduction through use of tread projections may be implemented to limit the effects of exceptional traction traditionally provided by some articles of footwear.

At a high level, the present invention is directed toward an outsole having tread projections with extension members constructed to reduce traction and increase sensory input. The tread projections may have a low and wide profile, whereas the extension members may have a long and thin profile, in comparison. As such, the tread projections may be less flexible than the extension members and better suited for creating a base for said members, absorption of shock, and dispersion of impact force during wear. In contrast, the flexible extension members may bend and collapse during wear, becoming a wedge between the low and wide tread projections and the ground or surface itself. The flexible extension member, therefore, reduces the contact of the outsole and the low, wide tread projection. The reduction in contact reduces the outsole's grip on the ground or surface, thereby enabling slippage. Further, each flexible extension member may move (e.g., roll, flip, and/or twist in any of 360 degrees), as interposed between tread projections and the ground, to enable controlled sliding, gliding, and/or slipping as desired by the wearer.

BRIEF DESCRIPTION OF THE DRAWINGS

Examples are described in detail below with reference to the attached drawing figures, wherein.

DETAILED DESCRIPTION

At a high level, the present invention is directed toward an outsole for an article of footwear that reduces grip of a traditional article of footwear. The outsole has a plurality of tread projections extending from the ground-contacting outsole surface and a plurality of extension members extending from the plurality of tread projections. Each tread projection has a distal surface, which is also configured to contact the ground. The distal surface may be planar or substantially planar. As such, the tread projection has a low and wide profile. Generally, the extension members extend from the tread projection. The extension members are generally more flexible than the tread projections. Therefore, when the footwear is worn, the extension members flex and bend such that said members are sandwiched between the low and wide tread projections and the ground-contacting surface of the outsole. During wear, the sandwiched extension members reduce the amount of the ground-contacting outsole surface and the tread projection distal surface that contact the ground. The reduced contact enables a wearer to slide, slip, and/or glide across the ground surface or terrain. Additionally, the reduced contact created by the flexible extension members promotes air circulation around the outsole.

Figure 1:
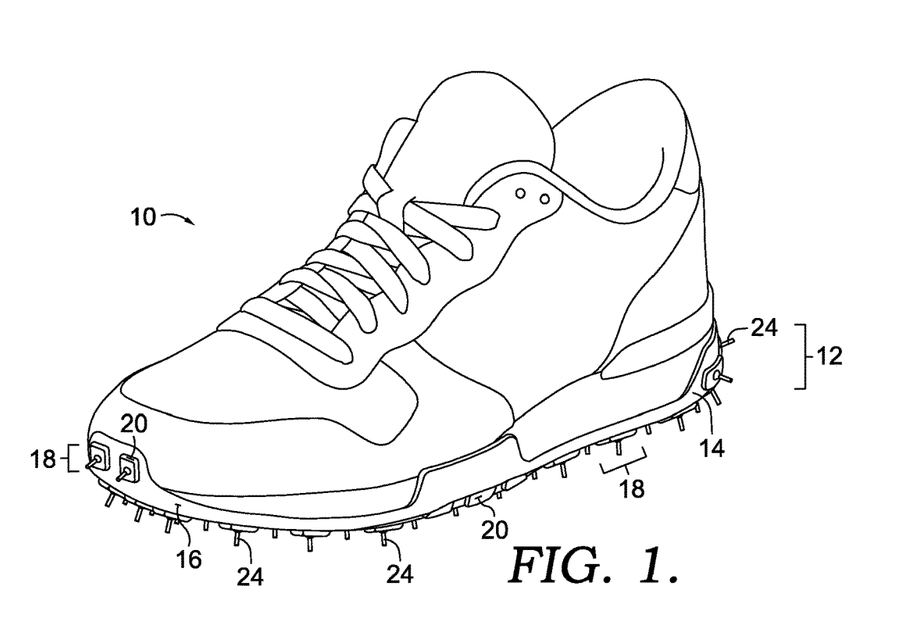
FIG. 1 depicts a top-down lateral perspective view of an exemplary article of footwear with an outsole in accordance with an aspect of the invention.
Figure 2:
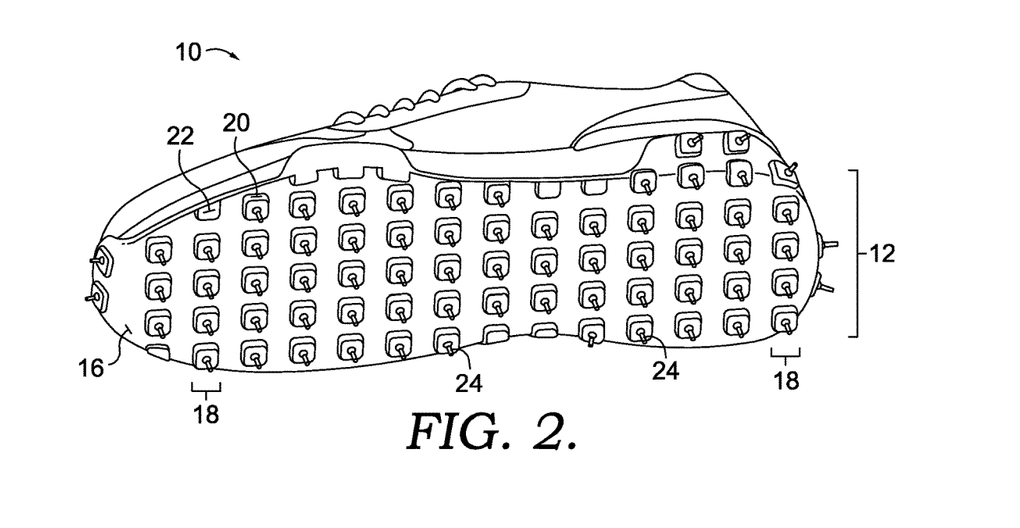
FIG. 2 depicts a bottom lateral perspective view of the exemplary article of footwear of FIG. 1, in accordance with an aspect of the invention.

FIGS. 1-2 illustrate an exemplary article of footwear 10 with an outsole 12. FIG. 1, for example, depicts a top-down lateral perspective view of an exemplary article of footwear 10 with an outsole 12, in accordance with an aspect of the invention. FIG. 2 illustrates a bottom lateral perspective view of the exemplary article of footwear of FIG. 1, in accordance with an aspect of the invention. The outsole 12 is, generally, the layer or layers of an article of footwear 10 (i.e., a shoe) made for directly contacting the ground. Casual or athletic shoes may have outsoles made from natural rubber, a plastic, or a synthetic material, such as polyurethane. The outsole 12 includes a sole foundation 14. In some aspects, at least a portion of the sole foundation 14 extends and curves upward proximate or at a perimeter of the article of the footwear 10. The upward aspect is with respect to a surface (e.g., ground) when the footwear is worn such the upward aspect is proximate to a footwear upper, in aspects. The perimeter of the footwear 10 roughly corresponds to the end or edge of the sole foundation 14, and mimics the footprint of the footwear 10. The sole foundation 14 includes a first surface 16 and an opposing second surface (not shown). The first surface 16 is generally configured as a ground-contacting surface. In aspects where the sole foundation 14 extends and curves upward toward an upper, for example, at a perimeter of the article of footwear 10, the first surface 16 follows the curved, upward extension so as to be exterior facing or outward facing at or near at least a portion of the perimeter. The first surface 16 may comprise the same or similar materials of the outsole 12 such as natural rubber, a plastic, or a synthetic material, such as polyurethane. Additionally, the first surface 16 may be treated with a coating or finish that imbues the first surface 16 with water repellant, anti-stick, or other characteristics, for example.

The first surface 16, being configured (e.g., intended) to contact the ground, includes a plurality of tread projections 18 extending outward from the first surface 16 to form a tread. The plurality of tread projections 18 may comprise natural rubber, a plastic, or a synthetic material, such as polyurethane. Additionally, the plurality of tread projections 18 may comprise the same or similar material composition as the sole foundation 14 and/or the first surface 16, in some aspects. The tread projections 18 may extend outward from the sole foundation 14. In some aspects, the tread projections 18 extend outward perpendicular to, or substantially perpendicular to, the sole foundation 14 and/or the first surface 16. In other aspects, the tread projections 18 may extend outward at an acute or obtuse angle in relation to the sole foundation 14 and/or the first surface 16.

In some aspects, the dimensions (e.g., size, shape, height, length, width, base, diameter, cross section) of a tread projection and the one or more materials from which it is constructed may affect and determine flexibility, rigidity, shock absorption, impact resistance, shape retention, compression, expansion, and/or durability characteristics of said tread projection. The tread projections 18 may be hexahedrons having six faces (e.g., cuboid), for example, wherein one of the six faces is adjacent to, abuts, and/or contacts the outsole 12 first surface 16. Alternatively, the tread projection may be a frustrum, for example. Generally, the dimensions of a tread projection 18 produce a low and wide profile that promotes stability, reduces flexibility, and absorbs shock, in aspects. All or substantially all of the tread projections within the plurality of tread projections 18 may have the same or substantially similar dimensions, in aspects. All or substantially all of the tread projections within the plurality of tread projections 18 may be constructed of the same or substantially similar one or more materials, in aspects. In some aspects, all or substantially all of the tread projections within the plurality of tread projections 18 have the same or substantially similar dimensions and are constructed of the same or substantially similar one or more materials. In such aspects, the plurality of tread projections 18 are substantially uniform in appearance and/or function. In other aspects, the plurality of tread projections 18 are not uniform in appearance and/or function. For example, a tread projection located near the toe region of the article of footwear 10 may have different dimensions and/or profile than a tread projection located near the ball region of the article of footwear 10. In another example, a tread projection located along the perimeter of the article of footwear where the sole foundation 14 extends and curves upward (e.g., upward relative to the ground or other surface commonly contacted during wear and proximate to an upper) may be different in size, shape, length, width, offset 27 (e.g., see FIG. 5), and/or configuration from a tread projection located near the interior (e.g., centrally located between medial and lateral regions of the first surface 16) region of the sole foundation 14. In yet another example, the size, shape, length, width, offset 27 (e.g., see FIG. 5), and/or configuration of a tread projection located along the perimeter of the article of footwear 10 where the sole foundation 14 extends and curves upward (e.g., toward and proximate to an upper) may increase or promote contact with a surface (e.g., ground) during wear.

Each tread projection of the plurality of tread projections 18 has at least one sidewall surface 20 and at least one distal surface 22. For example, the sidewall surface 20 may extend from the sole foundation first surface 16 to the distal surface 22 such that the distal surface 22 is offset (see e.g., FIG. 5) from the sole foundation first surface 16 by the sidewall surface 20. In further examples, the sidewall surface 20 may extend between the sole foundation first surface 16 and the distal surface 22 forming a distal surface offset 27 distance. The sidewall surface 20 may extend outward perpendicular to, or substantially perpendicular to, the sole foundation 14, in aspects. The sidewall surface 20 may extend outward perpendicular to, or substantially perpendicular to, the sole foundation first surface 16, in some aspects. In further aspects, the sidewall surface 20 may extend outward perpendicular to, or substantially perpendicular to, both the sole foundation 14 and the first surface 16. The sidewall surface 20 may extend outward at an angle from one or both of the sole foundation 14 and/or first surface 16 such that the sidewall surface 20 is beveled, slanted, and/or sloped, inward or outward, in various aspects. The further aspects, the sidewall surface 20 may extend outward or inward in a curved and/or rounded fashion from one or both of the sole foundation 14 or first surface 16. In yet further aspects, each tread projection may have more than one sidewall surface 20 wherein all the sidewalls' respective surfaces are the same or similar in size, shape, length, width, curve, angle, and/or slope. Alternatively, each tread projection having more than one sidewall surface 20 may include a combination of sidewall surfaces that are perpendicular, angled, rounded surfaces, or a combination thereof, in some aspects. As such, the upward, curved extension of the sole foundation 14 near the perimeter of the footwear may affect the height, length, width, size, shape, and/or configuration of the sidewall surface 20.

The plurality of tread projections 18 includes extension members 24. The extension members 24, as illustrated herein, are shown in a non-collapsed configuration for simplicity. Generally, each tread projection in the plurality 18 includes one extension member 24. Alternatively, each tread projection 18 may include more than one extension member 24, in further aspects. Extension members 24 may extend outward from the distal surface 22 of the tread projection 18, which may be described as the extension member length 26 (see FIG. 5). Extension members 24 are generally greater in length than width. In further examples, an extension member 24 may be at least twice as long as it is wide. Extension members 24 may be cylindrical (e.g., right or elliptic), conical (e.g., parabolic, spherically blunted, bi-conic), pyramidal (e.g., triangular, regular, pentagonal), or cuboid (e.g., rectangular), in various aspects. An extension member 24 may be widest where it is proximate to the corresponding tread projection distal surface 22, in aspects. For example, the width of an extension member 24 may gradually increase in width along its length as it nears the distal surface 22, or alternatively, the width may gradually increase along a proximal portion 28 (see FIG. 5) of the length near the distal surface 22. In other aspects, the width of an extension member 24 may be discrete or step-wise along the entire extension member length 26 such that the width increases the more proximate or closer the extension member 24 is placed to the distal surface 22. Or alternatively, the width of an extension member 24 may increase along a proximal portion 28 of the extension member length 26 such that the width increases as placed proximate to or closer to the distal surface 22.

Extension members 24 may be interiorly located on corresponding tread projection distal surfaces 22 such that each extension member 24 is located closer to the center of a corresponding tread projection distal surface 22 than to a perimeter of said corresponding tread projection distal surface 22, in aspects. An extension member 24 may be centrally located, or substantially centrally located, on a tread projection distal surface 22, in some aspects. In further aspects, the placement of an extension member 24 on a tread projection distal surface 22 may be determined by the specific location of the tread projection 18 on the sole foundation 14 and/or the first surface 16. For example, when a tread projection 18 is located near the medial side of the footwear 10, an extension member 24 may be located near a medial portion of the tread projection distal surface 22. In another example, when a tread projection 18 is located near the ball of the footwear 10, an extension member 24 may be centrally located within the tread projection distal surface 22. In yet a further example, when a tread projection 18 is located at or near the perimeter of the sole foundation 14 that extends and curves upward toward an upper of the footwear 10, for example, an extension member 24 may be located on the tread projection distal surface 22 so as to maximize contact of the extension member 24 with a surface (e.g., ground). As such, the extension member 24 may be located near the exterior or perimeter of a tread projection distal surface 22, wherein the perimeter may be described as an edge where a face of the sidewall surface 20 meets with the distal surface 22.

Generally, extension members 24 are configured to increase sensory input through a sensory multiplier effect which may aid the wearer in navigating a particular ground cover, surface, or other terrain (e.g., underwater reef, artificial turf, natural turf, indoor track inclines) when wearing the article of footwear 10. The extension members 24 may also facilitate and promote smooth slippage of the outsole 12 across a surface when desired (e.g., bowling alley, curling). Additionally, the ease of sliding or slipping may facilitate play of certain recreational sports in unorthodox environments and on different surfaces. For example, curling might be performed on an indoor basketball court instead of an ice rink. In some aspects, the dimensions (e.g., size, shape, height, length, width, base, diameter, and/or cross section) of the extension member imbue the extension member with superior flexibility as compared to the tread projections 18, for example. The dimensions of the extension members 24 will be discussed in detail with regard to FIGS. 5-8, hereinafter.

In aspects, the extension members 24 are integrally formed with the tread projections 18 using an injection molding process. The extension members 24 and the tread projections 18 may comprise the same or similar materials. In some aspects, colored material may be used during production to visually differentiate the extension members 24 from the tread projections 18. Color distinction may facilitate visual quality control inspection of the outsole 12, create an eye-catching retail display, and indicate wear of the outsole 12 to a consumer. For example, a material in a first color (e.g., orange) for constructing the extension members 24 may be injected into a mold prior to the addition of the same material in a second color (e.g., blue) for constructing the tread projections 18 to the same mold, for example. In alternative aspects, the extension members 24 and the tread projections 18 comprise different materials, are not integrally formed during an injection molding process, and/or are the same or similar in color.

Figure 3:
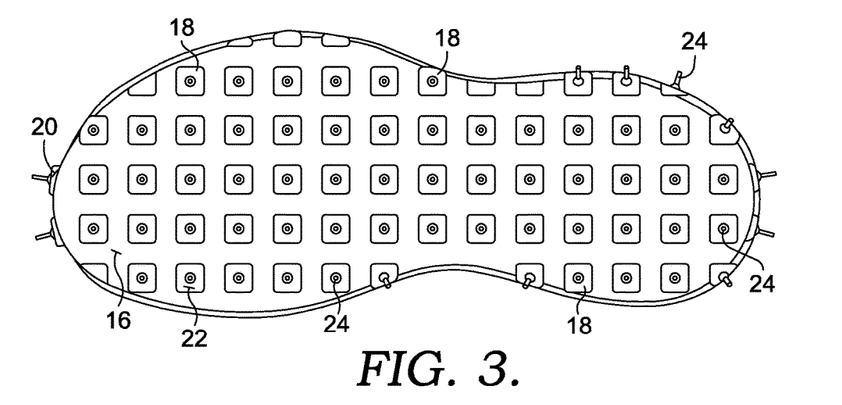
FIG. 3 depicts a bottom plan view of the outsole of the exemplary article of footwear of FIG. 1, in accordance with an aspect of the invention.

FIG. 3 depicts a bottom plan view of the outsole 12 of the exemplary article of footwear of FIG. 1, in accordance with an aspect of the invention. As shown in FIG. 3, the tread projections 18 may be evenly spaced or substantially evenly spaced across the entire or substantially all of the sole foundation 14 and/or the first surface 16. Alternatively, the tread projections 18 may be arranged in a grid-like, a checkerboard-like, an alternating, a repeating, a symmetrical, or an asymmetrical pattern, in some aspects. In aspects, the tread projection distal surface 22 follows or mimics the relief of the sole foundation 14 and/or the first surface 16. As such, in some aspects, the tread projection distal surface 22 curves upward toward a footwear 10 upper, and further, may have a curve similar to the sole foundation 14 at the perimeter of the article of footwear. In other aspects, the distal surface 22 may be different to the relief or surface shape of the sole foundation 14 and/or the first surface 16. For example, the tread projection distal surface 22 may have a flat, substantially flat, or otherwise more planar surface compared to the relief or surface shape of the corresponding sole foundation 14 to which the tread projection 18 is attached, based on the location of the tread projection 18 (e.g., proximity to toe region, ball region, arch region, heel region, medial, lateral, perimeter, and/or interior) of the footwear 10. In another example, the tread projection distal surface 22 may have a greater curvature than the relief or surface shape of the corresponding sole foundation 14 to which the tread projection 18 is attached, based on the proximity of the tread projections 18 to the perimeter of the footwear 10.

Figure 4:
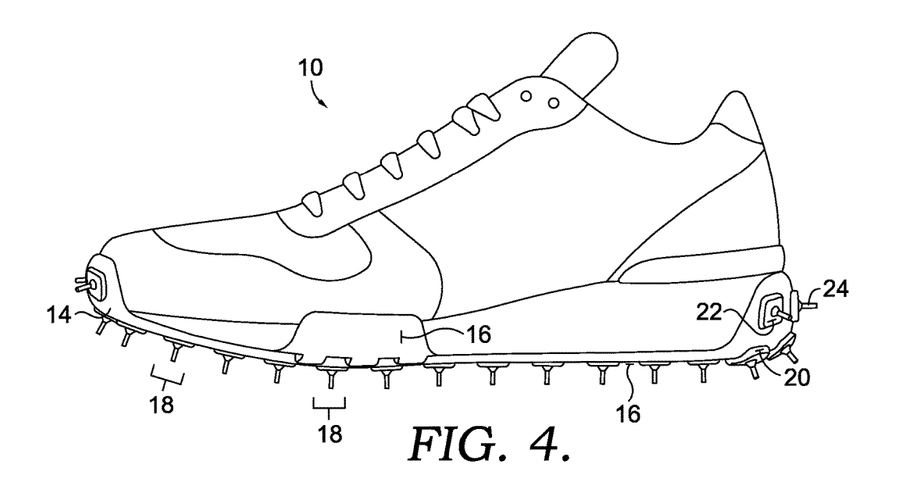
FIG. 4 depicts a side plan view of the outsole of the exemplary article of footwear of FIG. 1, in accordance with an aspect of the invention.

FIG. 4 depicts a side plan view of the exemplary article of footwear of FIG. 1, in accordance with an aspect of the invention. As illustrated in FIG. 4, at least a portion of the sole foundation 14 may extend and curve upward toward a footwear 10 upper until proximate said upper at, near or along the perimeter of the footwear 10 located at or near the toe region and/or heel region, for example. In some aspects, based on placement, spacing, and configuration, the tread projections 18 may cover all or substantially all of the first surface 16 of the sole foundation 14. In other aspects, based on placement, spacing, and configuration, the tread projections 18 may only cover one or more portions of the sole foundation 14. For example, the tread projections 18 may be placed, spaced, and/or configured so as to substantially cover specific portions of the sole foundation 14, such as the toe region, ball region, and heel region of the footwear 10. In another example, the tread projections 18 may be placed, spaced, and/or configured to cover one or more portions of the upward extension of the sole foundation 14 at the perimeter of the footwear 10. In yet another example, the tread projections 18 may be placed, spaced, and/or configured so as to cover some portions of the sole foundation 14 more than other portions. In such an example, the greatest coverage may correspond to areas where a reduction in grip is desired. Accordingly, the tread projection distal surface 22 may follow or mimic the relief or surface shape of the sole foundation 14. And, as each tread projection 18 has an extension member 24, the extension member 24 may extend outward perpendicular to the tread projection distal surface 22, the first surface 16, and/or the sole foundation 14, in various aspects. Perimeter located tread projections 18 and extension members 24 located thereon may facilitate ground contact when a wearer pushes off of the toe region, leans on the medial or lateral perimeter of the footwear, and/or digs the heel region into a surface during wear.

When the article of footwear 10 is worn, the tread projections 18 may be compressed to aid with shock absorption and impact resistance while remaining sufficiently rigid to maintain their shape. The dimensions (e.g., size, shape, distal surface offset 27, surface area, length, width, base, diameter, and/or cross section) of the tread projections 18 may reduce flexibility and promote shape stability compared to the extension members 24, for example. Tread projection dimensions will be discussed in detail with regard to FIGS. 5-8, hereinafter. In contrast to the stability of tread projections 18, however, the dimensions of extension members 24 allow for flexibility that enables the extension members 24 to be pushed to the side and/or against at least a portion of the tread projection distal surface 22. In aspects, the extension members 24 collapse such that the extension member length 26 contacts a portion of the tread projection distal surface 22. The orientation, direction, and/or arrangement of collapsed extension members 24 may be random. The orientation, direction, and/or arrangement of the collapsed extension members 24 may be affected by the gait of a wearer. The orientation, direction, and/or arrangement of the collapsed extension members 24 may be affected by the location of the extension member 18 in relation to the sole foundation 14 of the article of footwear 10 (e.g., proximity to toe region, ball region, arch region, heel region, medial, lateral, perimeter, and/or interior). The orientation, direction, and/or arrangement of the collapsed extension members 24 may be at least partially controlled by altering the angle of extension to promote collapsing in a particular direction of the article of footwear 10 (e.g., proximity to toe region, ball region, arch region, heel region, medial, lateral, perimeter, and/or interior). The orientation, direction, and/or arrangement of the collapsed extension members 24 may be at least partially controlled by altering the dimensions, shape, and size of the extension members 24 to promote a preferential collapse direction. The orientation, direction, arrangement, and/or extent of the collapse may be at least partially controlled by altering the ratio of: the extension member length 26 to the distal surface offset 27; the extension member length 26 to a distance from a one side of the distal surface 22 to an opposing side of the distal surface 22; a cross sectional area of the extension member compared to a surface area of the distal surface 22; a cross sectional area of the extension member proximal portion 28 to a cross sectional area of the extension member distal portion 30, both cross sections taken along the same axis; and/or a combination thereof, in various aspects. In further aspects, the aforementioned ratios may be determined by or customized based on a type of footwear, a sport or activity, or preferred orthopedic support needs of a particular wearer. The collapsed extension members may facilitate increased sensory input or sensory multiplier effect to aid a wearer in navigating a particular ground cover, surface, or other terrain (e.g., underwater reef, artificial turf, natural turf, and/or indoor track inclines). This increased input or amplified sensory effect may also enable the user to intentionally slide, slip, glide, skid, and/or drift during activity.

Figure 5:
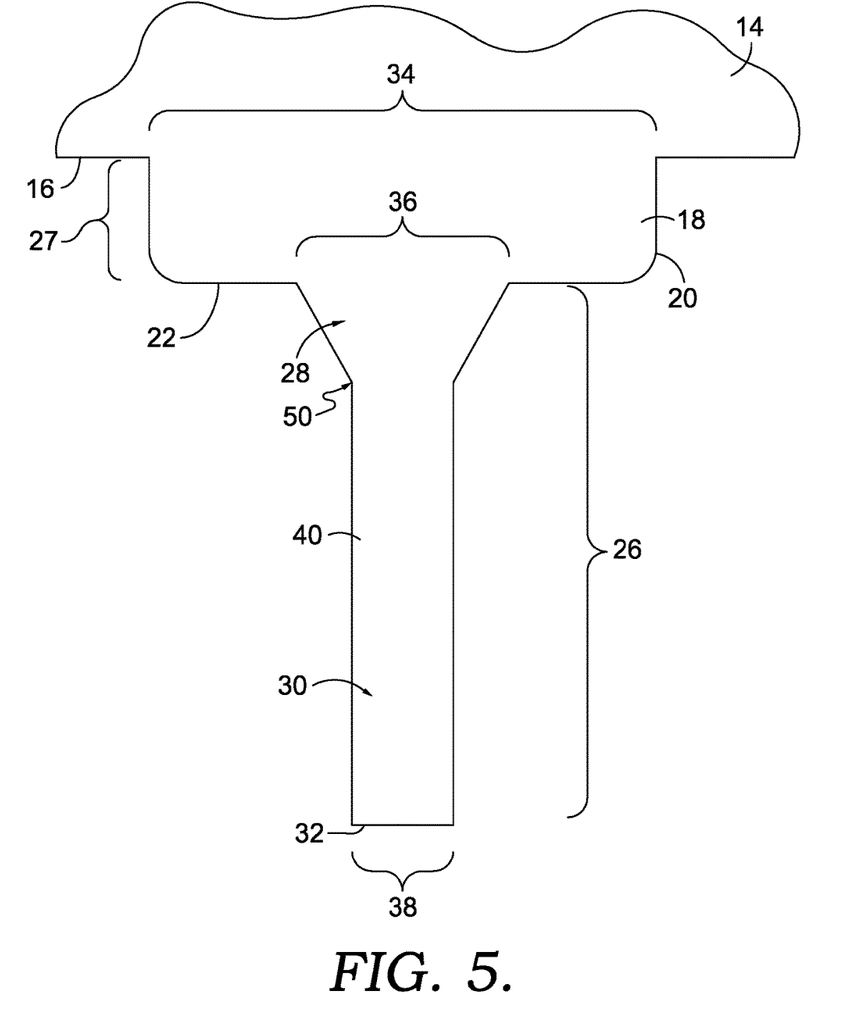
FIG. 5 depicts an enlarged side view of a portion of the outsole of the exemplary article of footwear of FIG. 1, in accordance with an aspect of the invention.
Figure 6:
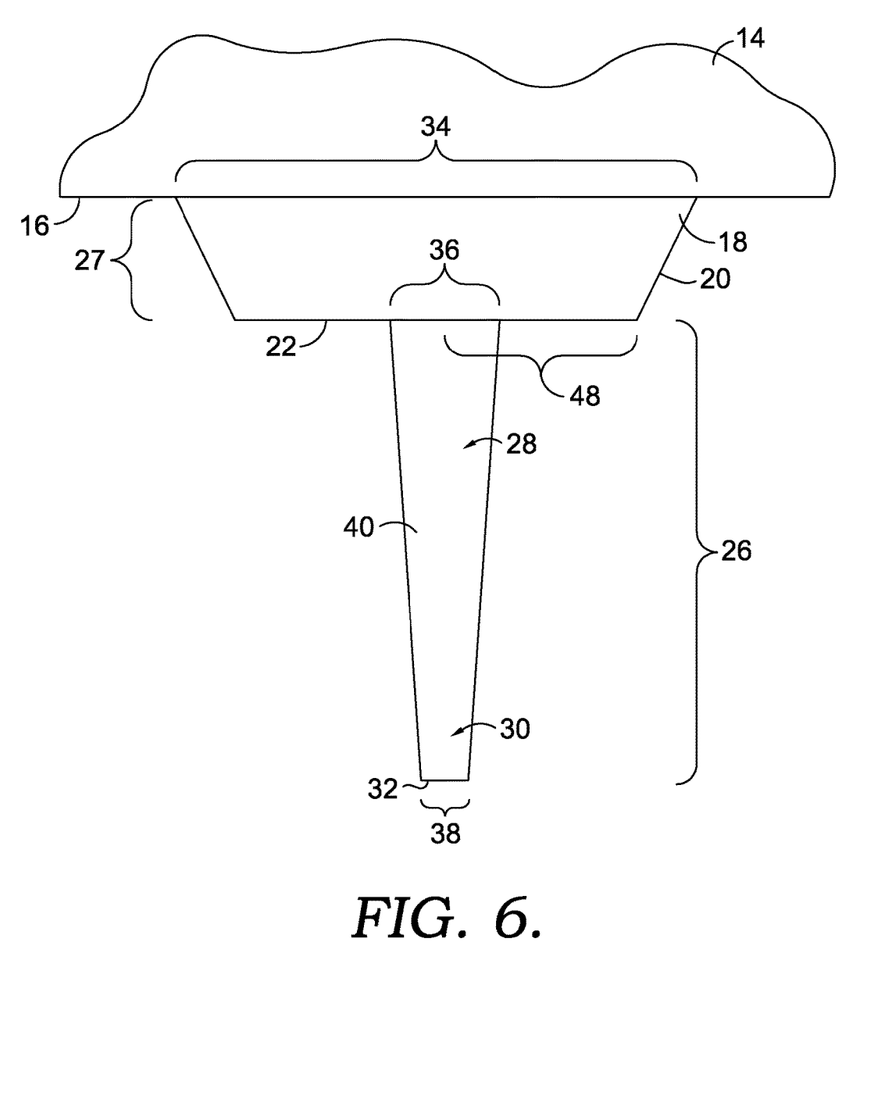
FIG. 6 depicts an alternative enlarged side view of a portion of an outsole, in accordance with an aspect of the invention.
Figure 7:
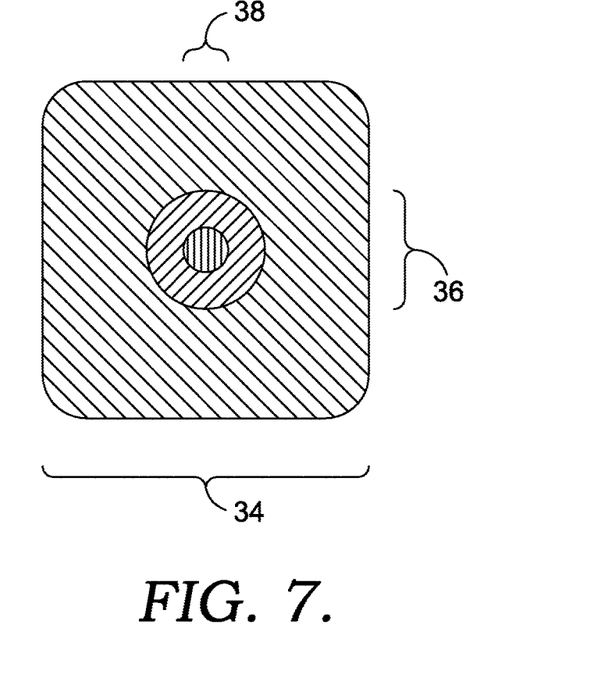
FIG. 7 depicts an augmented enlarged bottom view of the outsole of the exemplary article of footwear of FIG. 1, in accordance with an aspect of the invention.
Figure 8:
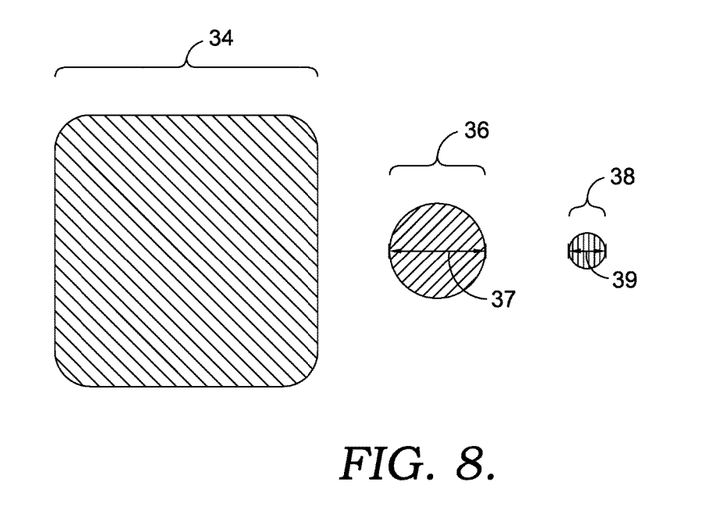
FIG. 8 depicts an exemplary exploded view of the elements depicted in FIG. 7, in accordance with an aspect of the invention.

FIGS. 5, 6, 7, and 8 depict various views of the outsole 12 of the exemplary article of footwear of FIG. 1, in accordance with an aspect of the invention. FIG. 5 depicts an enlarged side view of a portion of the outsole of the exemplary article of footwear of FIG. 1 and FIG. 6 illustrates an alternative enlarged side view of a portion of said outsole 12. FIG. 7 depicts an augmented enlarged bottom view of the outsole 12 and FIG. 8 depicts an exemplary exploded view of the elements depicted in FIG. 7, in accordance with an aspect of the invention. Generally, the various exemplary depictions presented in FIGS. 5, 6, 7, and 8 illustrate the dimensional relationships between a tread projection 18, a sidewall surface 20, a distal surface 22, a distal surface offset 27, a distal surface first area 34, an extension member 40, an extension member length 26, an extension member second area 36, a proximal portion 28, a distal portion terminus 32, and an extension member third area 38. The dimensional relationships, as illustrated, have been simplified for explanation purposes. For example, the cross sectional areas of the first, second, and third areas 34, 36, and 38 are indicated by simplified brackets generally corresponding to a width or diameter, as shown in FIGS. 5 and 6. In FIGS. 7 and 8, the cross sectional areas of the first, second, and third areas 34, 36, and 38 are planar, having been simplified for visual comparison. In FIG. 7, the first, second, and third areas 34, 36, and 38 have been overlaid with one another for comparison. In FIG. 8, the first, second, and third areas 34, 36, and 38 have been depicted side by side for comparison. For example, a width 37 of the cross sectional second area 36 of the extension member 40 is greater than a width 39 of the cross sectional third area 38 of the extension member 40, as illustrated in exemplary FIG. 8. However, these figures are not drawn to scale and therefore should not be interpreted as limiting the dimensional relationships beyond the description set forth hereinafter. In FIG. 5, each of the sole foundation 14, tread projection 18, and extension member 40 may be integrally formed, in some aspects. For example, each of the sole foundation 14, tread projection 18, and extension member 40 may be injection molded at one time. In FIG. 6, each of the sole foundation 14, tread projection 18, and extension member 40 may not be integrally formed, in some aspects. For example, each of the sole foundation 14, tread projection 18, and extension member 40 may be injection molded one at a time, building on a prior injection. In such an example, the injection of material forming the extension member 40 may be injected first, followed by the injection of material forming the tread projection 18, and further, followed by the material forming the sole foundation 14. Variation of injection materials, amounts of material injected, and/or color variations of the injected materials may be used, in further aspects.

As shown, the tread projection distal surface 22 is offset 27 from the first surface 16. The distance or height of the offset 27 bears a relationship to the distal surface first area 34. This offset 27 to first area 34 ratio is determined to promote stability and compression of the tread projection 18. In general, the ratio of the offset 27 to the distal surface first area 34 is such that the tread projection 18 appears low and wide in profile when compared to the extension member 24. In some aspects, the extension 40 length may be twice as long as the distal surface offset, such that the tread projection 18 is lower in profile and less flexible than the extension member 24. The lesser flexibility of the tread projection imbued by the ratio of the distal surface offset 27 to the extension member length 26 promotes stability and provides a support base for the more-flexible extension member 24. Continuing, the offset 27 also bears a relationship or ratio to the distal surface first area 34 that promotes stability and supports the extension member 24. The distal surface first area 34 may be described as all or substantially all of the surface area of the distal surface 22. In further aspects, the distal surface first area 34 may be described as all or substantially all of the surface area of the distal surface 22 that contacts the ground at one time. In one example, the dimensions (e.g., height) of the offset 27 bear a specific relationship to an apothem of the distal surface first area 34, when the first area 34 is a regular polygon. A regular polygon may be described as a polygon having sides that are all of the same length. An apothem describes the distance from a central point of a regular polygon to any side of the regular polygon at a right angle (e.g., a ninety degree angle). In this particular example, the distal surface first area 34, being a regular polygon, has a surface area (A) equal to one-half of the apothem as multiplied by the perimeter of the first area 34, or $A=\frac{1}{2}(apothem)(perimeter)$. In other examples, the shape of the distal surface first area 34 (e.g., circle, triangle, rectangle, trapezoid, irregular polygon, convex polygon, and/or concave polygon) may be expressed differently. For example, where the distal surface first area 34 is a convex polygon, the surface area of the first area 34 may be expressed as $A=\frac{1}{2}[(x_1y_2+x_2y_3+ \ldots x_ny_1)-(y_1x_2+y_2x_3+ \ldots y_nx_1)]$. Specific mathematical relationships regarding irregular polygons, as will be apparent to those skilled in the art, will not be discussed in detail herein. Nonetheless, the surface area of the distal surface first area 34 may be determined and compared to the distal surface offset 27. In aspects having a first area 34 that is a regular polygon, the distal surface offset 27 is less than the apothem of the distal surface first area 34, in order to maintain a low and wide tread projection profile. In aspects having a first area 34 that is not a regular polygon, the distal surface offset 27 may be less than the longest vector from the center of a polygon to a vertex, wherein a vertex is the point where two sides of the polygon meet. An exemplary vertex 48 is shown in FIG. 6. For example, for a rectangular distal surface first area 34, the offset 27 may be less than one-half of the diagonal of said rectangular first area 34. The diagonal of a rectangle may be expressed as the square root of the sum of both the width squared and the length squared, or $D=\sqrt{(w^2+l^2)}$. In another example, for a triangular distal surface first area 34, the distal surface offset 27 may be less than the distance from the centroid of a triangle to a vertex. The centroid of a triangle may be found by taking any given triangle and connecting the midpoints of each leg of the triangle to the opposite vertex. The connection line of each midpoint to the opposite vertex is described as a median. The medians intersect at the centroid of the triangle. Further, for simplicity, only single-plane surface areas are mathematically described in examples herein. However, as described previously, the distal surface 22 may have a three-dimensional relief or surface shape. And, an area having a multi-planar surface shape (e.g., a surface shape including a rough texture or relief with divots, bumps, ribs, waves, and/or grooves) has a greater surface area than an area having a single plane surface shape. In the various aspects, the offset 27 generally remains smaller or less than other dimensions (e.g., length, width, diameter, base) so as to maintain a low and wide tread projection profile.

Continuing on, the dimensions of the extension member 40 bear relationships to the dimensions of the tread projection. In aspects, extension member length 26 bears a relationship to the distal surface first area 34 and dimensions thereof (e.g., apothem, half the diagonal of a rectangle, distance from the centroid of a triangle to a vertex, radius of a circle). For instance, when the extension member 40 collapses during wear, the extension member length 26 bends over such that at least one side of the extension member 40 along the length contacts the distal surface first area 34. In some aspects, when the extension member 40 is bent over and/or collapsed, the extension member length 26 extends at least to a perimeter of the distal surface 22 and/or to an edge where the tread projection sidewall surface 20 meets the distal surface 22. In further aspects, when the extension member 40 is bent over and/or collapsed, the extension member length 26 extends beyond the perimeter of the distal surface 22 and/or to an edge where the tread projection sidewall surface 20 meets the distal surface 22. In such aspects, a portion of the extension member length 26 may further contact the tread projection sidewall surface 20 in addition to another portion of the extension member length 26 contacting the distal surface 22. In some aspects, the extension member 40 may be filleted where the extension member 40 contacts and/or adjoins the tread projection distal surface 22. When bent over and/or collapsed during wear, the extension member 40 may be sandwiched between the distal surface 22 and the ground, for example. In further aspects, the extension member 40 may roll and/or move while sandwiched between the distal surface 22 and the ground.

Further, an extension member 40 has a proximal portion 28 and a distal portion 30 having a dimensional relationship as well. The extension member proximal portion 28 is proximate to the tread projection distal surface 22 while the extension member distal portion 30 is proximate a distal portion terminus 32 or end of the extension member 40. The distal portion terminus is less proximate to or farther from the tread projection distal surface 22 than the proximal portion 28, in aspects. For example, the extension member proximal portion 28 may be more proximate the tread projection distal surface 22 than the extension member distal portion. In aspects, the extension member proximal portion 28 has a greater cross sectional area than a cross sectional area of the extension member distal portion 30, wherein both cross sectional areas are taken perpendicular or substantially perpendicular to the extension member length 26. The terms perpendicular and substantially perpendicular may be used interchangeably herein. Because of its greater cross sectional area, the proximal portion 28 may be less flexible than other portions of the extension member 40 having smaller cross sectional areas. In some aspects, the proximal portion 28, having a greater perpendicular cross sectional area than the distal portion 30, may create or serve as a base for the extension member 40. Additionally and/or alternatively, the proximal portion 28 may add to the durability to the extension member 40, reduce the likelihood that the extension member 40 is torn from a tread projection, and/or serve as a pivot location (e.g., exemplary pivot point 50 shown in FIG. 5) from which the extension member 40 may bend and/or collapse during wear of the footwear. In further aspects, the difference in cross sectional areas facilitates the intact and efficient removal of the extension member 40 from an injection mold. For example, the greater cross sectional area of the proximate portion creates a stable and/or stronger base to the lesser cross sectional area of the distal portion such that the proximate portion helps facilitate the extraction of the distal portion from the mold. As such, the extension member 40 has at least a second area 36 which is a cross sectional area that is perpendicular to the extension member length 26. Any number of cross sectional areas (e.g., a third area, a fourth area) may be determined. Generally, when viewed in cross section perpendicular to the extension member length 26, the width of the proximal portion 28 is greater than the width of the distal portion 30. In various aspects, the change in width and/or cross sectional areas between the portions may be gradual and/or incremental along all or substantially all of the extension member length 26 (e.g., see FIG. 6). In other aspects, the change in width and/or cross sectional area is affected near and/or at the proximal portion 28. For example, the proximal portion 28 may be conical or pyramidal in shape, whereas the distal portion may be cylindrical.

The extension member length 26 further bears a relationship to a cross sectional width of the extension member proximal portion 28 adjacent the tread projection distal surface 22. In various aspects, the cross sectional width is a maximum or minimum width of the proximal portion 28. In aspects, the extension member length 26 is at least twice the cross sectional width of the proximal portion 28. In further aspects, the extension member length 26 is at least three times the width of the proximal portion 28. Generally, the ratio of the extension member length 26 to the proximal portion 28 width is such that the extension member 40 appears long and thin.

The extension member second area 36, which is a cross sectional area perpendicular to the extension member length 26, bears a dimensional relationship to the tread projection distal surface first area 34, which is a surface area. Generally, the first area 34 is larger than the second area 36. In some aspects, the first area 34 is at least two times the area of the second area 36. In further aspects, the first area 34 is at least three times the area of the second area 36. As such, the tread projection is less flexible than the extension member 40 because of the larger first area 34. Additionally, the tread projection offset 27, being smaller than the extension member length 26, further contributes to the tread projection being less flexible that the extension member 40. The respective cross sectional first and second areas may be compared in overlay in FIG. 7 or side by side in FIG. 8. The simplified visual comparison may be useful, albeit FIGS. 7 and 8 are not drawn to scale and therefore should not be interpreted as limiting beyond this disclosure.

Figure 9:
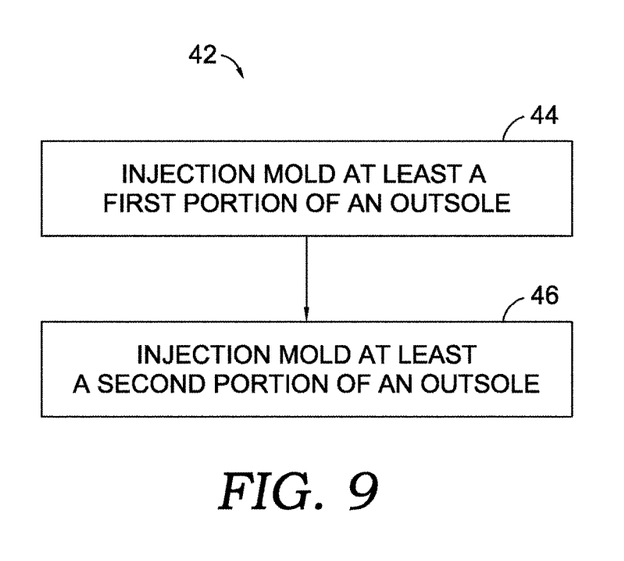
FIG. 9 depicts a method for manufacturing the outsole of the exemplary article of footwear of FIG. 1, in accordance with an aspect of the invention.

Turning to FIG. 9, it depicts an exemplary method 42 for constructing the outsole 12 of the exemplary article of footwear of FIG. 1, in accordance with an aspect thereof. For increased clarity, outsole 12 components of FIGS. 1-4 may be referenced. At block 44, the method 42 includes injection molding at least a first portion of an outsole 12 using a first material, which may be of a first color. In aspects, the at least a first portion of the outsole 12 corresponds to extension members 24. The method 42 further includes injection molding a second portion of the outsole 12 using the first material, which may be of the first color or of a second color, at block 46. In some aspects, the second portion of the outsole 12 corresponds to tread projections 18. As such, the final outsole 12 may have extension members 24 that are not the same color as tread projections 18. Color distinction between extension members 24 and tread projections 18 may facilitate visual quality control inspection of the outsole 12, create an eye-catching retail display, and indicate wear of the outsole 12 to a consumer. For example, material in a first color (e.g., orange) for constructing the extension members 24 may be injected into a mold prior to the addition of the same material in a second color (e.g., blue) for constructing the tread projections 18 to the same mold, for example. Additionally and/or alternatively, the one or more material injection sites of the outsole 12 mold do not correspond to one or more extension members 24. Rather, the mold creates each individual extension member. As such, the difference in cross sectional areas of the proximal and distal portions 28 and 30 of an extension member 40 may facilitate the intact and efficient removal of extension members 24 from the injection mold. In further aspects, the method includes extraction of the outsole 12 from the mold.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. An outsole for an article of footwear, the outsole comprising:
    a sole foundation, the sole foundation having a first surface, the first surface configured as a ground-contacting surface;
    a plurality of tread projections, each of the plurality of tread projections having a sidewall surface and a tread projection distal surface, the sidewall surface extending between the sole foundation first surface and the tread projection distal surface forming a distal surface offset distance, the tread projection distal surface having a first area; and
    an extension member, the extension member comprised of a proximal portion and a distal portion, the extension member having an extension member length extending from the tread projection distal surface to an extension member distal end, the extension member having a cross sectional area perpendicular to the extension member length that is a second area, the first area being at least three times the area of the second area, the extension member length being at least twice a width of the second area, wherein the extension member length allows for flexibility that enables the extension member to be pushed sideways and to collapse and contact the tread projection distal surface, wherein the collapse of the extension member reduces traction of the article of footwear when worn.

2. The outsole of claim 1, wherein at least a portion of the sole foundation extends and curves upward proximate a perimeter of the article of the footwear.

3. The outsole of claim 2, wherein the at least a portion of the sole foundation corresponds to a placement of a heel region, a toe region, an arch region, or a combination thereof.

4. The outsole of claim 1, wherein the plurality of tread projections are evenly spaced across the sole foundation and are of similar size and shape.

5. The outsole of claim 1, wherein the distal surface offset distance is less than or equal to an apothem of the distal surface first area.

6. The outsole of claim 1, wherein the distal surface offset distance is less than a greatest vector from a center of the tread projection distal surface to a vertex of the tread projection distal surface.

7. The outsole of claim 1, wherein the extension member length is at least twice the distal surface offset distance.

8. The outsole of claim 1, wherein the extension member length is greater than or equal to one of an apothem of the distal surface first area or a greatest vector from a center of the tread projection distal surface to a vertex of the tread projection distal surface.

9. The outsole of claim 1, wherein the second area corresponds to the extension member proximal portion.

10. The outsole of claim 1, wherein the second area corresponds to the extension member distal portion.

11. An outsole for an article of footwear, the outsole comprising:
- a sole foundation, the sole foundation having a first surface, the first surface configured as a ground-contacting surface;
- a plurality of tread projections, each of the plurality of tread projections having a sidewall surface and a tread projection distal surface, the sidewall surface extending from the sole foundation first surface to the tread projection distal surface such that the tread projection distal surface is offset from the sole foundation first surface by the sidewall surface, the tread projection distal surface having a first area; and
- an extension member, the extension member comprised of a proximal portion and a distal portion, the proximal portion more proximate the tread projection distal surface than the distal portion, the extension member having an extension member length extending from the tread projection distal surface to an extension member distal end, the proximal portion having a cross sectional area perpendicular to the extension member length that is a second area, the distal portion having a cross sectional area perpendicular to the extension member length that is the third area, the first area being at least three times the area of the second area, the second area larger than the third area, the extension member length being at least twice a width of the second area of the proximal portion, wherein the extension member length allows for flexibility that enables the extension member to be pushed sideways and to collapse and contact the tread projection distal surface, wherein the collapse of the extension member reduces traction of the article of footwear when worn.

12. The outsole of claim 11, the extension member length being at least twice the distal surface offset.

13. The outsole of claim 11, the extension member length being greater than or equal to one of an apothem of the distal surface first area or a greatest vector from a center of the tread projection distal surface to a vertex of the tread projection distal surface.

14. The outsole of claim 11, the first area being at least three times the area of the third area.

15. The outsole of claim 11, the second area being at least twice the area of the third area.

16. The outsole of claim 11, the second area and the third area being round to facilitate a rolling motion of the extension member when the outsole is used.

17. The outsole of claim 11, at least a portion of the proximal portion incrementally changing in width along the extension member length such that the proximal portion adjacent the tread projection distal surface is widest.

18. The outsole of claim 17, at least a portion of the proximal portion forming a pivot point about which the extension member bends.

* * * * *

UNITED STATES PATENT AND TRADEMARK OFFICE
CERTIFICATE OF CORRECTION

PATENT NO. : 10,165,827 B2
APPLICATION NO. : 14/546643
DATED : January 1, 2019
INVENTOR(S) : Mark Smith et al.

It is certified that error appears in the above-identified patent and that said Letters Patent is hereby corrected as shown below:

In the Specification

Column 3, Line 57: Please remove "frustrum" and replace with --frustum--.

In the Claims

Column 14, Line 4: Please remove "the" and replace with --a--. (first occurrence)

Signed and Sealed this
Twelfth Day of March, 2019

Andrei Iancu
*Director of the United States Patent and Trademark Office*